United States Patent
Utkovski et al.

(10) Patent No.: US 12,381,659 B2
(45) Date of Patent: *Aug. 5, 2025

(54) ARQ/HARQ-RELATED PROCEDURE FOR GRANT-FREE RANDOM ACCESS

(71) Applicant: Fraunhofer-Gesellschaft zur Förderung der angewandten Forschung e.V., Munich (DE)

(72) Inventors: Zoran Utkovski, Berlin (DE); Baris Göktepe, Berlin (DE); Johannes Dommel, Berlin (DE); Thomas Fehrenbach, Berlin (DE); Lars Thiele, Berlin (DE); Cornelius Hellge, Berlin (DE); Martin Kasparick, Berlin (DE); Thomas Schierl, Berlin (DE); Stephan Blankenstein, Berlin (DE); Thomas Wirth, Berlin (DE)

(73) Assignee: FRAUNHOFER-GESELLSCHAFT ZUR FORDERUNG DER ANGEWANDT FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,551

(22) Filed: Aug. 10, 2023

(65) Prior Publication Data
US 2023/0388060 A1    Nov. 30, 2023

Related U.S. Application Data

(63) Continuation of application No. 17/092,911, filed on Nov. 9, 2020, now Pat. No. 11,770,216, which is a
(Continued)

(30) Foreign Application Priority Data

May 11, 2018 (EP) ..................... 18171864

(51) Int. Cl.
| | | |
|---|---|---|
| H04L 1/1812 | (2023.01) | |
| H04W 72/04 | (2023.01) | |
| H04W 74/0833 | (2024.01) | |

(52) U.S. Cl.
CPC .......... *H04L 1/1812* (2013.01); *H04W 72/04* (2013.01); *H04W 74/0833* (2013.01)

(58) Field of Classification Search
CPC ....... H04L 1/18; H04L 1/1803; H04L 1/1806; H04L 1/1809; H04L 1/1812;
(Continued)

(56) References Cited

U.S. PATENT DOCUMENTS

| | | |
|---|---|---|
| 11,516,826 B2 | 11/2022 | Cao et al. |
| 2011/0243080 A1 | 10/2011 | Chen et al. |

(Continued)

FOREIGN PATENT DOCUMENTS

| | | |
|---|---|---|
| CN | 105722222 A | 6/2016 |
| CN | 107113756 A | 8/2017 |

(Continued)

OTHER PUBLICATIONS

Chinese language office action dated Aug. 25, 2023, issued in application No. CN 201980043459.0.
(Continued)

*Primary Examiner* — Brian T Le
(74) *Attorney, Agent, or Firm* — McClure, Qualey & Rodack, LLP

(57) ABSTRACT

A user equipment, UE, for a wireless communication network including one or more base stations, performs a transmission to a base station using a grant-free, GF, transmission scheme. The transmission being performed in accordance with a GF transmission configuration. The UE receives from the base station a certain signaling. The certain signaling indicates that the base station failed to
(Continued)

identify the UE from the transmission. Responsive to the certain signaling from the base station, the UE retransmits the transmission in accordance with a GF retransmission configuration. The GF retransmission configuration is different from the GF transmission configuration.

20 Claims, 10 Drawing Sheets

Related U.S. Application Data continuation of application No. PCT/EP2019/062042, filed on May 10, 2019.

(58) Field of Classification Search
CPC ... H04L 1/1816; H04L 1/1819; H04L 1/0001; H04L 5/00; H04W 72/04; H04W 16/00; H04W 36/06; H04W 72/12; H04W 74/0833; H04B 7/024
See application file for complete search history.

(56) References Cited

U.S. PATENT DOCUMENTS

| | | |
|---|---|---|
| 2015/0327275 A1 | 11/2015 | Kwon et al. |
| 2016/0037512 A1 | 2/2016 | Lei |
| 2016/0219627 A1 | 7/2016 | Au et al. |
| 2017/0288817 A1 | 10/2017 | Cao et al. |
| 2018/0035458 A1 | 2/2018 | Islam et al. |
| 2018/0035459 A1* | 2/2018 | Islam .................... H04L 5/0053 |
| 2018/0109976 A1 | 4/2018 | Ly et al. |
| 2018/0123765 A1 | 5/2018 | Cao et al. |
| 2018/0139773 A1* | 5/2018 | Ma .................... H04L 27/26025 |

FOREIGN PATENT DOCUMENTS

| | | |
|---|---|---|
| EP | 3355633 A1 | 9/2018 |
| WO | 2016/101802 A1 | 6/2016 |
| WO | 2017066942 A1 | 4/2017 |
| WO | 2017/182053 A1 | 10/2017 |

OTHER PUBLICATIONS

MCC Support; "Draft Report of 3GPP TSG RAN WG1 #91 v0.4.0;" 3GPP TSG RAN WG1 Meeting #92 R1-180xxxx; Feb.-Mar. 2018; pp. 1-218.
3GPP 3GPP TR 38.811 V0.2.0, Study on New Radio (NR) to support Non Terrestrial Networks (Release 15), Sep. 2017.
Huawei & HiSilicon, "NTN Channel Modeling" 3GPP Technical Document-R1-1719844, Reno, USA, Nov. 2017.
Intel Corporation: "Support of link adaptation for UL grant-free NOMA schemes"; 3GPP Draft; RI-1610374 LA Grant-Freenoma, 3rd Generation Partnership Project (3GPP), Mobile Competence Centre. 650, Route Des Lucioles; F-06921 Sophia-Antipolis Cedex, France; vol. RAN WG1, No. Lisbon, Portugal; Oct. 10, 2016-Oct. 14, 2016; Oct. 9, 2016 (Oct. 9, 2016), XP051150385, Retrieved from the Internet: URL:http://www.3gpp.org/ftp/Meetings_3GPP_SYNC/RANI/Docs/.
Guangdong Oppo Mobile Telecom: "Discussion on power ramping and power control during RA procedure", 3GPP Draft; RI-1713281, 3rd Generation Partnership Project (3GPP), Mobile Competence Centre; 650, Route Des Lucioles ; F-06921 Sophia-Antipolis Cedex; France; vol. RAN WG1, No. Prague, Czech Republic; Aug. 21, 2017-Aug. 25, 2017; Aug. 20, 2017 (Aug. 20, 2017), XP051316088, Retrieved from the Internet: URL:http://www.3gpp.org/ftp/Meetings 3GPPSYNC/RANI/Docs/.
NTT Docomo et al: "Discussion on 4-step random access procedure for NR", 3GPP Draft; RI-1700614 Discussion on 4-Step Random Access Procedure for NR Final, 3rd Generation Partnership Project (3GPP), Mobile Competence Centre ; 650, Route Des Lucioles ; F-06921 Sophia-Antipol; vol. RAN WG1, No. Spokane, USA; Jan. 16, 2017-Jan. 20, 2017; Jan. 16, 2017 (Jan. 16, 2017), XP051208141, Retrieved from the Internet: URL:http://www.3gpp.org/ftp/Meetings 3GPPSYNC/RANI/Docs/.
M. Bennis et al.: "Ultrareliable and Low-Latency Wireless Communication: Tail, Risk, and Scale"; Proceedings of the IEEE; vol. 106, No. 10, Oct. 2018; pp. 1834 to 1853.
International search report and written opinion, Sep. 18, 2019, from PCT/EP2019/062042.
European Office Action dated Apr. 4, 2023, issued in application No. EP 19 722 623.6.
Huawei, et al.; "HARQ timing relationships for grant-free transmission;" 3GPP Draft; RI-167206, 3rd Generation Partnership Project (3GPP); Aug. 2016; pp. 1-2.
CATT; "UL grant-free transmission for URLLC;" 3GPP Draft; RI-1702105, 3rd Generation Partnership Project (3GPP); Feb. 2017; pp. 1-3.
ZTE, et al.; "Basic Grant-free Transmission for URLLC;" 3GPP Draft; RI-1701594 Basic Grant-Free Transmission for URLLC, 3rd Generation Partnership Project (3GPP); Feb. 2017; pp. 1-8.
NTT Docomo, et al.; "SLS evaluation on uplink multiple access;" 3GPP Draft; RI-1610077_SLS_GRANT_FREE, 3rd Generation Partnership Project (3GPP); Oct. 2016; pp. 1-12.
NTT Docomo, et al.; "Discussion on multiple access for UL mMTC;" 3GPP Draft; RI-167392_MA_MMTC, 3rd Generation Partnership Project (3GPP); Aug. 2016; pp. 1-9.
LG Electronics Inc; "HARQ retransmission of configured grant Type 1;" 3GPP Draft; R2-1802918_HARQ Retransmission of Configured Grant Type 1, 3rd Generation Partnership Project (3GPP); Feb. 2018; pp. 1-2.
Huawei, et al.; "The retransmission and HARQ schemes for grant-free;" 3GPP Draft; R1-1608859, 3rd Generation Partnership Project (3GPP); Oct. 2016; pp. 1-5.

* cited by examiner con't

```
rrcConfiguredRetransmissionPool      CHOICE {
    setup                     SEQUENCE {
        FFS: Merge the following two into one. Possibly don't use "periodicity"
for rrcConfiguredUplinkGrant
        poolID       INTEGER  --OPTIONAL,
        timeDomainOffset              ,
        timeDomainAllocation          , %duration
        frequencyDomainAllocation     , %bandwidth
        -- UE-specific DMRS configuration:
        dmrs                          ,
        mcsAndTBS             , %coderate
        nomaSequence                  ,
        -- The number or repetitions of K:
        repK                          },
    release              NULL}
```

Fig. 7

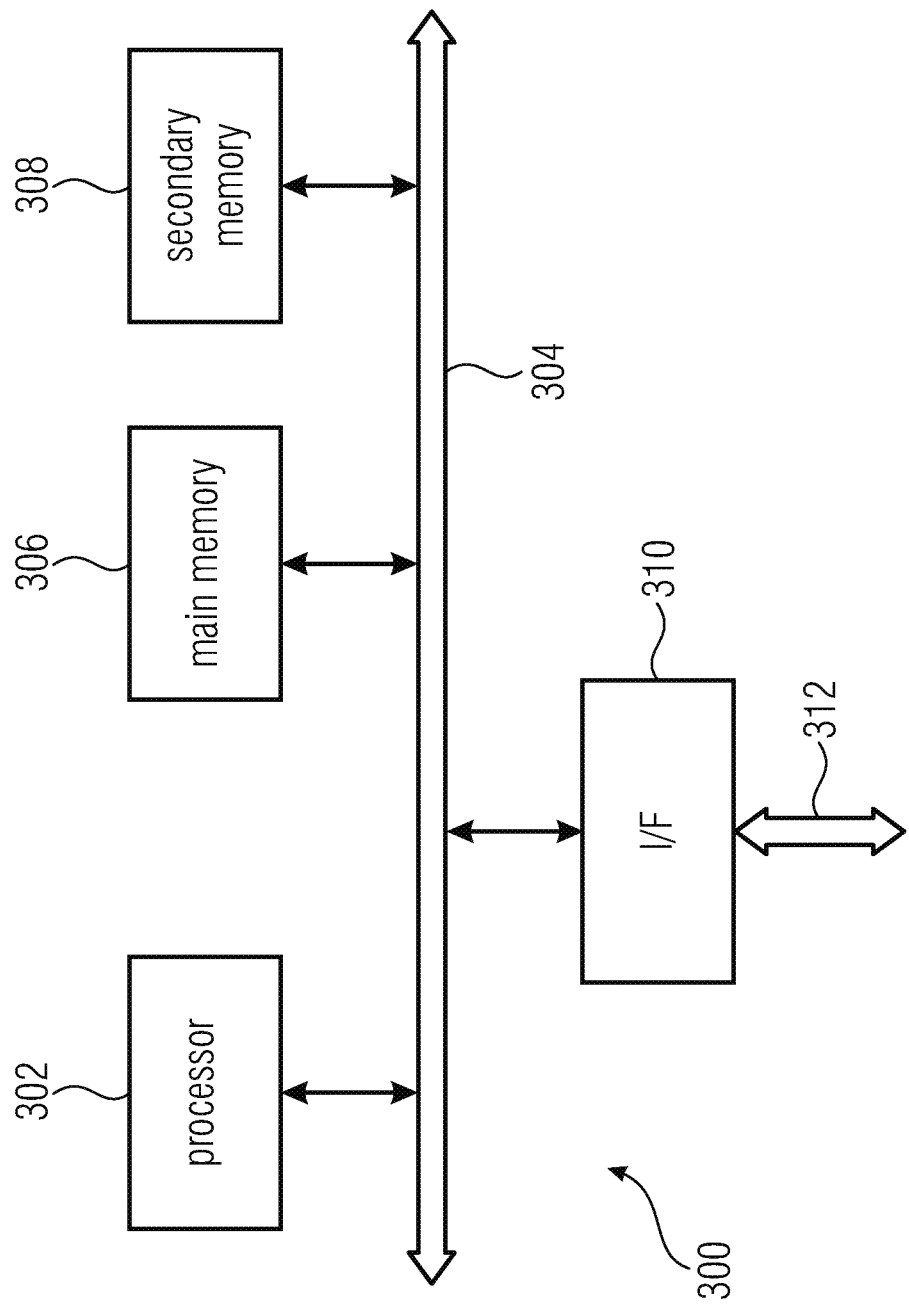

ARQ/HARQ-RELATED PROCEDURE FOR GRANT-FREE RANDOM ACCESS

CROSS-REFERENCE TO RELATED APPLICATIONS

This application is a continuation of U.S. patent application Ser. No. 17/092,911, filed on Nov. 9, 2020, now U.S. Pat. No. 11,770,216, which is continuation of copending International Application No. PCT/EP2019/062042, filed May 10, 2019, which is incorporated herein by reference in its entirety, and additionally claims priority from European Application No. EP 18171864.4, filed May 11, 2018, which is also incorporated herein by reference in their entirety.

The present application concerns the field of wireless communications, more specifically the field of grant-free random access transmissions. Embodiments provide an ARQ/HARQ related procedure for a grant-free random access of UEs enabling unidentified UEs to retransmit the transmission using a retransmission configuration different for the first transmission configuration. Other embodiments provide for an approach allowing a joint receiver, for example to a base station of the wireless communication network, to reliably detect the occurrence of grant-free transmissions by UEs served by the base station.

BACKGROUND OF THE INVENTION

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In a wireless communication network or system as described above one network function is the random access, which is carried out by users when first accessing the system. In wireless communication networks, like 5G networks, the number of UEs may increase substantially when compared to the number of UEs operated in current networks or systems, for example due to a massive access of internet-of-things (IoT) applications. In such a scenario, the random access of such a high number of UEs may be an issue. More specifically, a massive random access paradigm, for example when considering IoT applications, is characterized by a huge number of UEs accessing sporadically the wireless channel of the system to transmit data. A contention-free, orthogonal multiple access protocol, such as TDMA, (O)FDMA, etc., may not meet the requirements for allowing such a sporadic access, because the resources are assigned to the users in a fixed and centralized manner. Such an approach, inevitably, results in a large signaling overhead, a high realization complexity and a low overall system efficiency. Contention-based mechanisms, e.g., ALOHA or slotted ALOHA, on the other hand, may suffer from a throughput degradation in the presence of a large or number of users due to the delay associated with the back off/retransmission mechanisms implemented in such contention-based mechanisms.

In existing wireless communication networks or systems, like a long term evolution (LTE) system, the uplink transmission may be scheduled by an access point, AP, for example by the base station, using a request-grant procedure. A user sends a scheduling request, SR, to the AP during the registration procedure. Following the sending of the scheduling request, the AP performs the scheduling to grant resources to the users in a centralized manner. The request-grant procedure, i.e., the initial association to the network, is performed in a contention-based manner.

The same mechanism may be used to reestablish a connection upon failure. The contention-based random access procedure includes four steps. In a first step, a preamble is transmitted by the user to the base station, eNB. In the second step, if the eNB detects the preamble, a random access response is transmitted, followed by two further signaling steps. If the eNB is not detecting the preamble, a timeout occurs at the UE, and the UE transmits a further random access sequence of the same preamble format.

In the presence of a massive number of devices or UEs which sporadically access the system, the contention-based random access procedure may result in a sharp degradation in performance and large access delays rendering, as a consequence, the communication impractical, at least for certain UE types or certain services, like ultra-reliable low latency communication, URLLC, services. To allow thousands of devices to access a wireless communication system, a grant-free random access scheme may be implemented allowing users to transmit to the AP simultaneously using grant-free resources which may be freely used by the respective UEs for the transmission, i.e., resources that are not allocated by the base station to a certain UE. Such a grant-free transmission may include, besides the data to be transmitted, also a user identity.

FIG. 2 schematically represents a transmission from UEs, $UE_1$, $UE_2$ ... $UE_n$, towards a base station BS using a grant-free random access. The radio link RL is schematically represented and the resources available for the communication are indicated, for example respective frequency/time resources. In FIG. 2, respective resource pools $R_1$ to $R_3$ are indicated of which, for example, the resources in resource block $R_2$ may be used by one or more of the UEs for a grant-free random access for an uplink transmission towards the base station BS, while one or more of the other resource pools $R_1$, $R_3$ may be used for a conventional communication using resources allocated to the UEs by the base station BS. In case of a grant-free uplink communication from one, some or all of the UEs, the uplink transmission uses the resources in resource pool $R_2$, and the base station BS detects active users or a subset thereof. The transmission may include the UE ID so that the base station BS may identify the UEs performing the grant-free transmission. The base station may send a control message to each UE that has been identified by the base station, for example an acknowledgement, ACK, message. The base station may use a unicast HARQ ACK feedback towards the UEs which have been identified. In other words, the control message stating the ACK is sent to each identified UE uniquely. The BS, in accordance with other examples, may send a multicast HARQ ACK feedback to all active UEs or users that were successfully decoded or detected. The multicast HARQ ACK feedback includes the identities of those UEs which have been identified by the base station.

However, for a subset of the UEs the base station BS may not be able to decode their transmissions on the respective grant-free resources, and the base station does not identify the respective UEs as active users. As a consequence, such UEs do not receive the acknowledgement message from the base station. Such a situation may occur, for example, when the system is overloaded. Those UEs which did not receive the acknowledgement message from the base station BS confirming that the UE has been identified, repeat their uplink transmission in the grant-free resource pool $R_2$ at the next random access opportunity or occasion. However, it is likely that at this point the system is still overloaded so that the probability that a non-identification of the UEs happens again is quite high.

It is noted that the information in the above section is only for enhancing the understanding of the background of the invention and therefore it may contain information does not form conventional technology that is already known to a person of ordinary skill in the art.

SUMMARY

An embodiment provides a user equipment, UE, for a wireless communication network including one or more base stations, wherein the UE is configured to perform a transmission to a base station using a grant-free, GF, transmission scheme, the transmission being performed in accordance with a GF transmission configuration, wherein the UE is configured to receive from the base station a certain signaling, the certain signaling indicating that the base station failed to identify the UE from the transmission, and wherein, responsive to the certain signaling from the base station, the UE is configured to retransmit the transmission in accordance with a GF retransmission configuration, the GF retransmission configuration being different from the GF transmission configuration.

According to another embodiment, a wireless communication system may have: one or more inventive UEs and one or more base stations, BSs, wherein the BS is configured to serve one or more UEs of the wireless communication network, wherein a certain number of the UEs, which are served by the BS, are configured to perform a transmission to the BS station using a grant-free, GF, transmission scheme, the transmission being performed in accordance with a GF transmission configuration, the BS is configured receive from the certain UEs respective grant free transmissions and to determine whether the certain UEs can be identified from the grant free transmission, and in case some or all of the certain UEs cannot be identified by the BS, the BS is configured to transmit a certain signaling, the certain signaling indicating that the BS failed to identify the certain UEs from the transmission, and causing the certain UEs to retransmit the transmission in accordance with a GF retransmission configuration, the GF retransmission configuration being different from the GF transmission configuration.

According to another embodiment, a method may have the steps of: performing by a user equipment, UE, of a wireless communication network, which includes one or more base stations, a transmission to a base station using a grant-free, GF, transmission scheme, the transmission being performed in accordance with a GF transmission configuration, receiving, at the UE, from the base station a certain signaling, the certain signaling indicating that the base station failed to identify the UE from the transmission, and responsive to the certain signaling from the base station, retransmitting, by the UE, the transmission in accordance with a GF retransmission configuration, the GF retransmission configuration being different from the GF transmission configuration.

Another embodiment may have a non-transitory digital storage medium having a computer program stored thereon to perform the inventive method when said computer program is run by a computer.

BRIEF DESCRIPTION OF THE DRAWINGS

Embodiments of the present invention will be detailed subsequently referring to the appended drawings, in which:

FIGS. 6A and 6B illustrate embodiments of a GF re/transmission timing in accordance with the inventive approach, wherein FIG. 6(a) illustrates an embodiment in which a GF retransmission occasion is earlier or later than a GF transmission occasion, FIG. 6(b) illustrates an embodiment in which a GF retransmission occasion is earlier than a GF transmission occasion;

FIG. 7 shows an example of a UE-specific RRC signaling for indicating a plurality of grant-free retransmission pool IDs in accordance with embodiments of the present invention; and FIG. 8 illustrates an example of a computer system on which units or modules as well as the steps of the methods described in accordance with the inventive approach may execute.

DETAILED DESCRIPTION OF THE INVENTION

Figure 1:
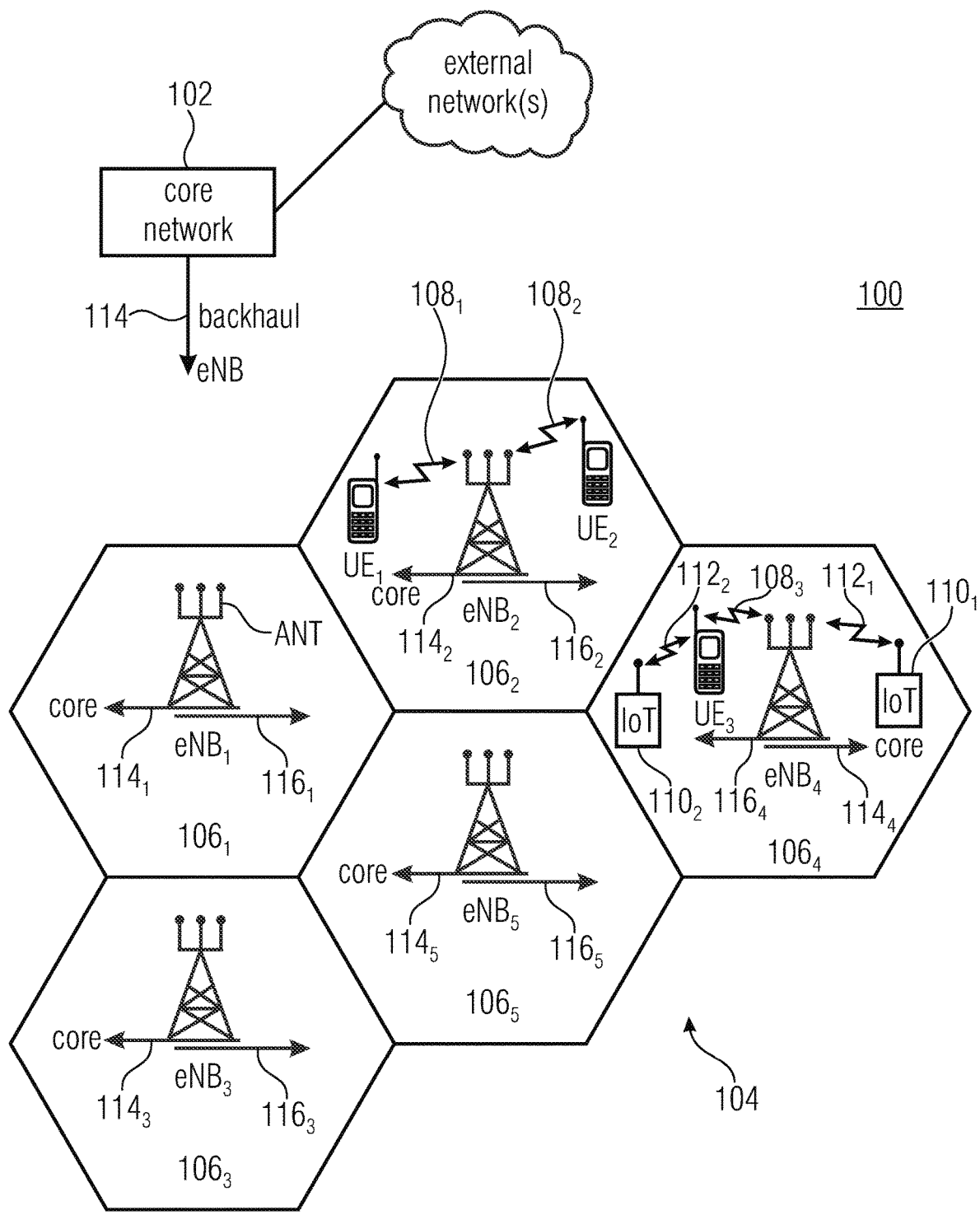
FIG. 1 shows a schematic representation of an example of a terrestrial wireless communication system.

Embodiments of the present invention are now described in more detail with reference to the accompanying drawings in which the same or similar elements have the same reference signs assigned.
First Aspect In a cellular wireless network, like a network described above with reference to FIG. 1 and to FIG. 2, when implementing a grant-free transmission scheme for an uplink transmission from one or more users to a receiver, it may occur, e.g., when the cell served by a base station is overloaded, that only some of the UEs performing the grant-free uplink transmission towards the receiver are actually identified, and the remaining UEs operating on the basis of the grant-free transmission scheme, which are not identified, repeat the grant-free uplink transmission at the next opportunity. However, in case the specific situation which resulted in the detection/identification of only a subset of the UEs performing the grant-free, GF, uplink transmission does not change, it is likely that the same will happen again, i.e., again only a subset of the GF-UEs (UEs performing an uplink transmission using grant-free resources) will be identified. Thus, UEs may experience delays in the uplink transmission which may not be acceptable for certain types of UEs or certain services implemented in the UEs, for example URLLC services.

The present invention is based on the finding that the above described problem is due to the fact that a GF-UE, which is not identified at the BS, uses the same parameters for the initial or first transmission and for the retransmission at the next opportunity for the grant-free access. To address this problem, in accordance with a first aspect of the present invention, the base station determines that for certain uplink transmissions on the resources allocated for the grant-free access, for example resources in resource block R$_2$ (see FIG. 2), the users performing the uplink transmission cannot be identified. Responsive to this determination the base station is aware that there are some UEs that try to access the base station using the grant-free access scheme, and sends a certain signaling, e.g., a broadcast message, indicating to the UEs in the coverage of the base station an identification of at least some of the UEs using the GF-resources failed. For example, a group non-acknowledgement, NACK, message may be sent via a broadcast signaling to all UEs. Responsive to such a group NACK message (certain signaling), those UEs which recognize that their uplink transmission has not been identified at the base station may change the current transmission configuration for the grant-free uplink transmission, also referred to as the GF transmission configuration, to a new or modified transmission configuration for the retransmission, also referred to as the GF retransmission configuration. The GF retransmission configuration is applied when retransmitting the transmission at the next opportunity for a grant-free access to the base station.

In accordance with the inventive approach, causing a modification of the grant-free transmission parameters so as to obtain grant-free retransmission parameters which are different from the initial parameters or the parameters used during the last grant-free transmission, the probability that the UE will be not identified again may be lowered, thereby improving the system performance, especially for latency sensitive transmissions by certain types of UEs or by certain services implemented by the UEs.

Figure 2:
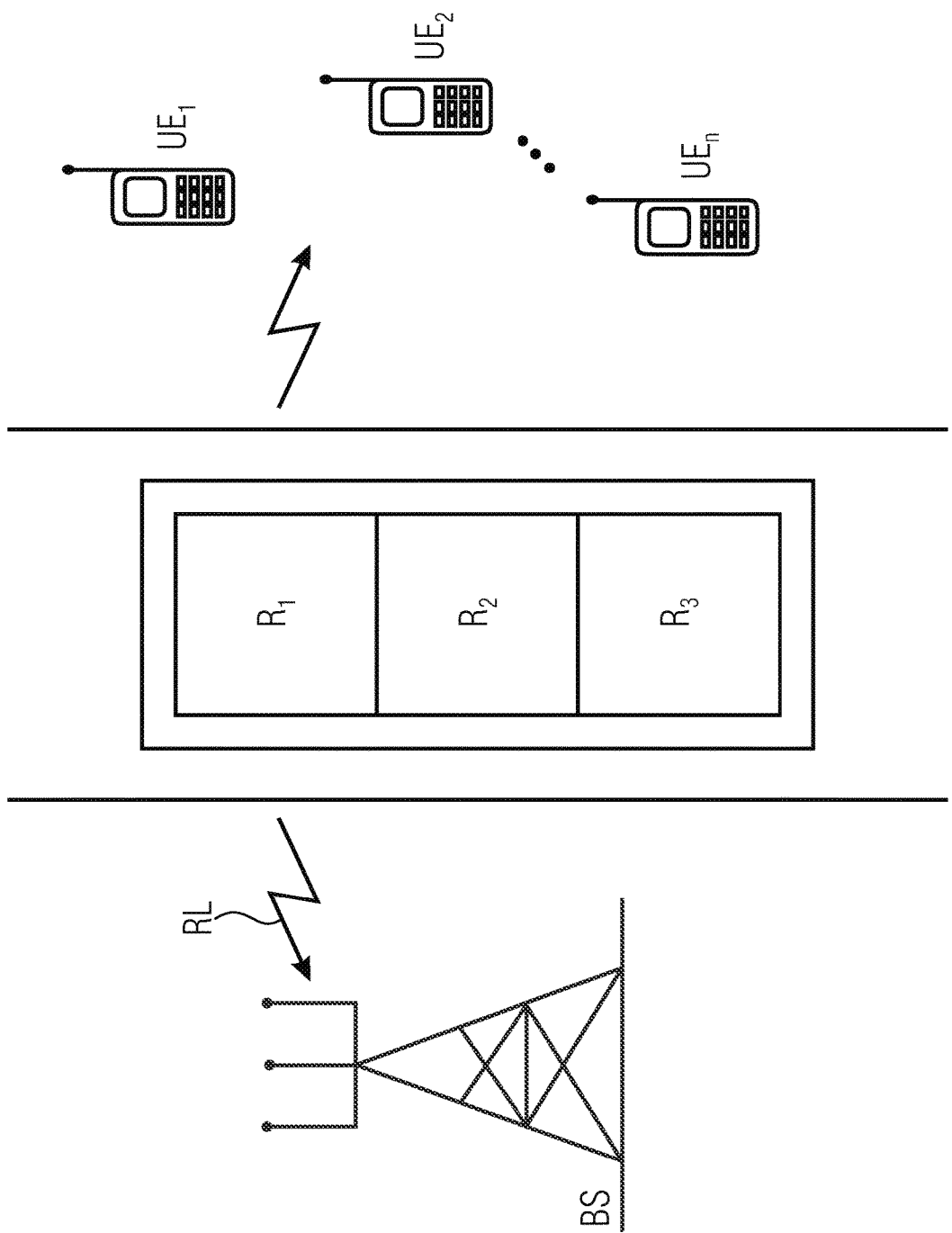
FIG. 2 schematically represents a transmission from a plurality of UEs towards a base station BS using a grant-free random access.
Figure 3:
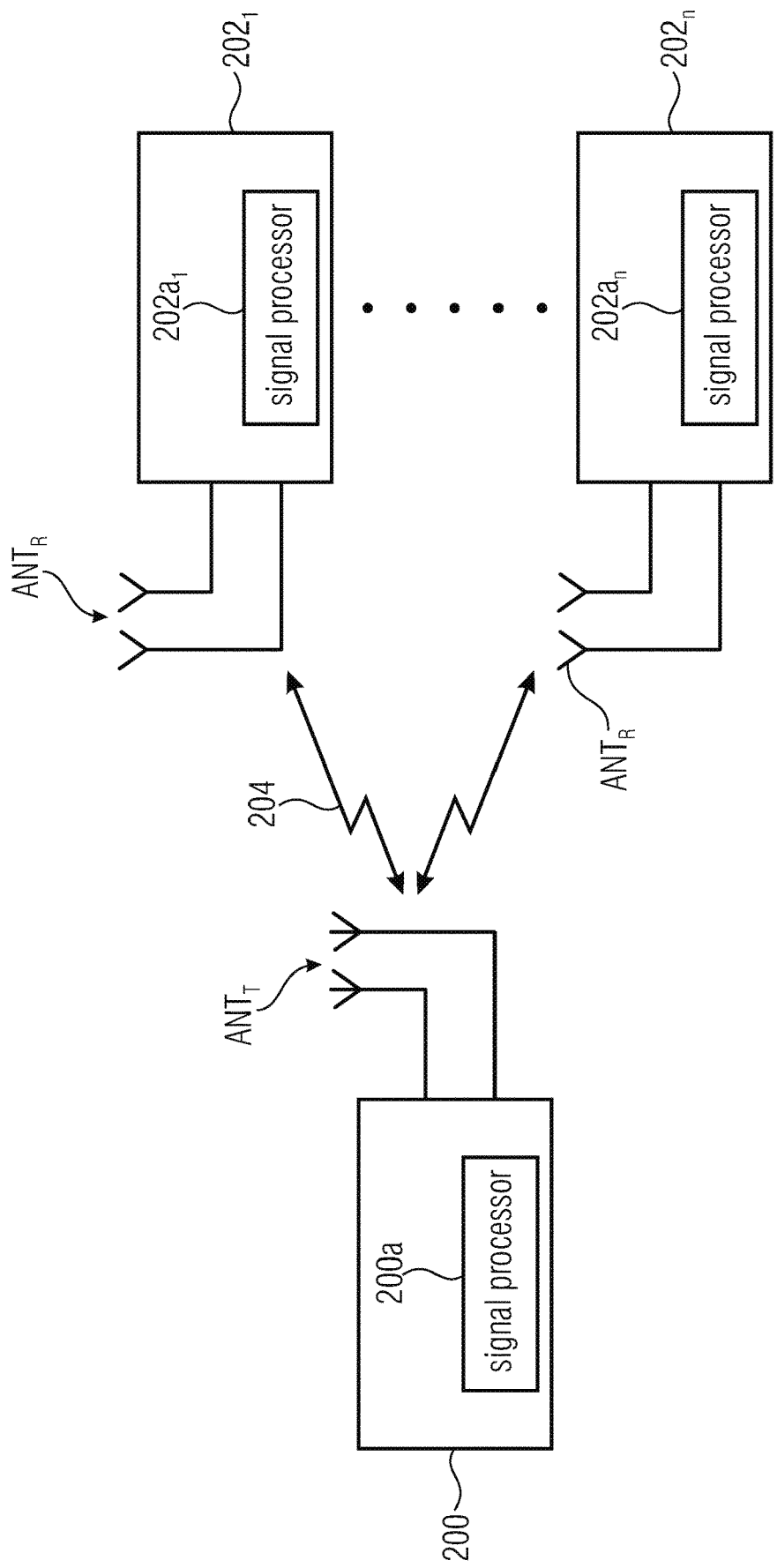
FIG. 3 is a schematic representation of a wireless communication system for communicating information between a transmitter, which may operate in accordance with the inventive teachings described herein, and a plurality of receivers, which may operate in accordance with the inventive teachings described herein.

Embodiments of the present invention may be implemented in a wireless communication system or network as depicted in FIG. 1 or FIG. 2 including transmitters or transceivers, like base stations, and receivers or users, like mobile or stationary terminals or IoT devices, as mentioned above. FIG. 3 is a schematic representation of a wireless communication system for communicating information between a transmitter 200, like a base station, and a plurality of receivers $202_1$ to $202_n$, like UEs, which are served by the base station 200. The base station 200 and the UEs 202 may communicate via a wireless communication link or channel 204, like a radio link. The base station 200 includes one or more antennas $ANT_T$ or an antenna array having a plurality of antenna elements, and a signal processor 200a. The UEs 202 include one or more antennas $ANT_R$ or an antenna array having a plurality of antennas, and a signal processor $202a_1$, $202a_n$. The base station 200 and the respective UEs 202 may operate in accordance with the inventive teachings described herein.

User Equipment

In accordance the first aspect, the present invention provides a user equipment, UE, for a wireless communication network including one or more base stations 200. The UE 202 performs a transmission to a base station 200 using a grant-free, GF, transmission scheme. The transmission is performed in accordance with a GF transmission configuration. The UE 202 is configured to receive from the base station 200 a certain signaling. The certain signaling indicates that the base station failed to identify the UE 202 from the transmission. Responsive to the certain signaling from the base station 200, the UE 202 retransmits the transmission in accordance with a GF retransmission configuration. The GF retransmission configuration is different from the GF transmission configuration.

In accordance with embodiments, the GF transmission configuration includes a GF transmission resource or a GF transmission resource pool, and the GF retransmission configuration includes a GF retransmission resource or a GF retransmission resource pool.

In accordance with embodiments, the GF retransmission resource pool is larger than the GF transmission resource pool.

In accordance with embodiments, the GF retransmission resource pool includes the GF transmission resource pool and additional resources, or the GF retransmission resource pool includes resources different from the GF transmission resource pool.

In accordance with embodiments, the UE is configured to select the GF retransmission resource randomly from the GF retransmission resource pool.

In accordance with embodiments, the GF retransmission resource pool includes a plurality of retransmission resource pools, the plurality of retransmission resource pools being of the same size or of different sizes, and the plurality of retransmission resource pools including a first GF retransmission resource pool and second GF retransmission resource pool.

In accordance with embodiments, the UE is configured to select the GF retransmission resource from first GF retransmission resource pool and from second GF retransmission resource pool randomly, or based on a UE-ID or group/service type, e.g. UEs of a certain type use the first GF retransmission resource pool, and other UEs use the second GF retransmission resource pool.

In accordance with embodiments, the GF retransmission resource pool includes at least one further GF retransmission resource pool.

In accordance with embodiments, the GF transmission configuration includes a GF transmission coding scheme, and the GF retransmission configuration includes a GF retransmission coding scheme, the GF transmission coding scheme being different from the GF retransmission coding scheme.

In accordance with embodiments, the GF transmission coding scheme includes a first NOMA sequence, and the GF retransmission coding scheme includes a second NOMA sequence, the second NOMA sequence being more robust than the first NOMA sequence, e.g., by using a lower code rate.

In accordance with embodiments, the GF transmission configuration includes a time at which the transmission is performed, and the GF retransmission configuration includes a plurality of time offsets for the retransmission relative to the time of the transmission.

In accordance with embodiments, the UE is configured to select, based on a UE-ID or a group/service type, from the plurality of time offsets randomly a time offset for the retransmission, or a preconfigured time offset for the retransmission.

In accordance with embodiments, UEs of a certain type use a preconfigured time offset, and other UEs use a random time offset.

In accordance with embodiments, the GF transmission configuration includes or identifies a plurality of grant-free access occasions during which grant-free transmissions are to be performed, the plurality of grant-free access occasions including at least a first grant-free access occasion and a second grant-free access occasion, and the GF retransmission configuration includes or identifies at least one further grant-free access occasion during which grant-free retransmissions are to be performed, the further grant-free access occasion being different from the second grant-free access occasion.

In accordance with embodiments, first UEs, e.g., latency sensitive UEs or services, like URLLC services, use a further grant-free access occasion that is earlier than the second grant-free access occasion, and second UEs, e.g., less sensitive UEs or services, like enhanced Mobile BroadBand, eMBB, massive Machine-Type Communication, mMTC, or IoTs, use a further grant-free access occasion that is later or earlier than the second grant-free access occasion.

In accordance with embodiments, the UE is preconfigured with a plurality of GF retransmission configurations, e.g., using an UE specific RRC signaling, and the UE is configured to receive a control message, like a DCI message, indicating which of the plurality of GF retransmission configurations is to be used by the UE responsive to the certain signaling.

In accordance with embodiments, a pre-configuration message indicates a plurality of GF retransmission pools, and the control message indicates one or more GF retransmission pools, and wherein the UE is configured to use, responsive to the certain signaling, the GF retransmission pool indicated in the control message, or in case no GF retransmission pool is indicated in the control message, a preconfigured default GF retransmission pool or the UE may randomly select one of the retransmission pools defined by the RRC signaling.

In accordance with embodiments, the UE is configured to receive a control message, like a DCI message, indicating a plurality of GF retransmission configurations, and wherein the certain signaling indicates which of the plurality GF retransmission configurations is to be used by UE responsive to receiving the certain signaling.

In accordance with embodiments, the DCI indicates a plurality of GF retransmission pools.

In accordance with embodiments, control message indicates the GF transmission pool explicitly or implicitly, e.g., using RNTI.

In accordance with embodiments, the certain signaling includes the GF retransmission configuration to be used by UE responsive to receiving the certain signaling In accordance with embodiments, the certain signaling indicates the GF resource associated with the transmission, and responsive to the certain signaling, the UE is configured to determine that the base station did not receive anything and is not aware of the transmission of the UE.

In accordance with embodiments, the transmission includes an UE identifier, e.g., a UE-specific DeModulation Reference Signal, DMRS.

In accordance with embodiments, the certain signaling comprises a broadcast NACK message transmitted by the base station to a plurality of UEs in wireless communication network.

In accordance with embodiments, the user equipment comprises one or more of:
a mobile or stationary terminal,
cellular IoT-UE
an IoT device,
a ground based vehicle,
an aerial vehicle,
a drone,
a building, or
any other item or device provided with network connectivity enabling the item/device to communicate using the wireless communication network, e.g., a sensor or actuator.

Base Station

In accordance the first aspect, the present invention provides a base station, BS, for a wireless communication system including one or more base stations. The base station 200 serves one or more UEs 202 of the wireless communication network. A certain number of the UEs 202, which are served by the base station 200, perform a transmission to the base station 200 using a grant-free, GF, transmission scheme. The transmission is performed in accordance with a GF transmission configuration. The base station 200 receives from the certain UEs 202 respective grant-free transmissions and determines whether the certain UEs can be identified from the grant-free transmission. In case some or all of the certain UEs cannot be identified by the base station 200, the base station 200 transmits a certain signaling. The certain signaling indicates that the base station 200 failed to identify the certain UEs from the transmission. This certain signaling causes the certain UEs to retransmit the transmission in accordance with a GF retransmission configuration. The GF retransmission configuration may be different from the GF transmission configuration.

In accordance with embodiments, the transmissions from the certain UEs include respective UE identifiers.

In accordance with embodiments, the certain signaling comprises a broadcast NACK message transmitted by the base station to the certain UEs in wireless communication network.

In accordance with embodiments, the certain UEs comprise one, some or all of the UEs served by the BS.

In accordance with embodiments, the certain signaling indicates the GF resource associated with the transmissions.

In accordance with embodiments, the certain signaling includes the GF retransmission configuration to be used by UE responsive to receiving the certain signaling.

In accordance with embodiments, the GF transmission configuration includes a GF transmission resource or a GF transmission resource pool, and the GF retransmission configuration includes a GF retransmission resource or a GF retransmission resource pool.

In accordance with embodiments, the GF retransmission resource pool is larger than the GF transmission resource pool.

In accordance with embodiments, the GF retransmission resource pool includes the GF transmission resource pool and additional resources, or the GF retransmission resource pool includes resources different from the GF transmission resource pool.

In accordance with embodiments, the GF retransmission resource pool includes a plurality of retransmission resource pools, the plurality of retransmission resource pools being of the same size or of different sizes, and the plurality of retransmission resource pools including a first GF retransmission resource pool and second GF retransmission resource pool.

In accordance with embodiments, the GF retransmission resource pool includes at least one further GF retransmission resource pool In accordance with embodiments, the GF transmission configuration includes a GF transmission coding scheme, and the GF retransmission configuration includes a GF retransmission coding scheme, the GF transmission coding scheme being different from the GF retransmission coding scheme.

In accordance with embodiments, the GF transmission coding scheme includes a first NOMA sequence, and the GF retransmission coding scheme includes a second NOMA sequence, the second NOMA sequence being more robust than the first NOMA sequence, e.g., by using a lower code rate.

In accordance with embodiments, the GF transmission configuration includes a time at which the transmission is performed, and the GF retransmission configuration includes a plurality of time offsets for the retransmission relative to the time of the transmission.

In accordance with embodiments, the GF transmission configuration includes or identifies a plurality of grant-free access occasions during which grant-free transmissions are to be performed, the plurality of grant-free access occasions including at least a first grant-free access occasion and a second grant-free access occasion, and the GF retransmission configuration includes or identifies at least one further grant-free access occasion during which grant-free retransmissions are to be performed, the further grant-free access occasion being different from the second grant-free access occasion.

In accordance with embodiments, the base station comprises one or more of:
- a macro cell base station, or
- a small cell base station, or
- a UE, or
- an AMF, or
- an SMF, or
- a core network entity, or
- any transmission/reception point (TRP) enabling an item or a device to communicate using the wireless communication network, the item or device being provided with network connectivity to communicate using the wireless communication network.

Computer Program Product

The present invention provides a computer program product comprising instructions which, when the program is executed by a computer, causes the computer to carry out one or more methods in accordance with the present invention.

Figure 4:
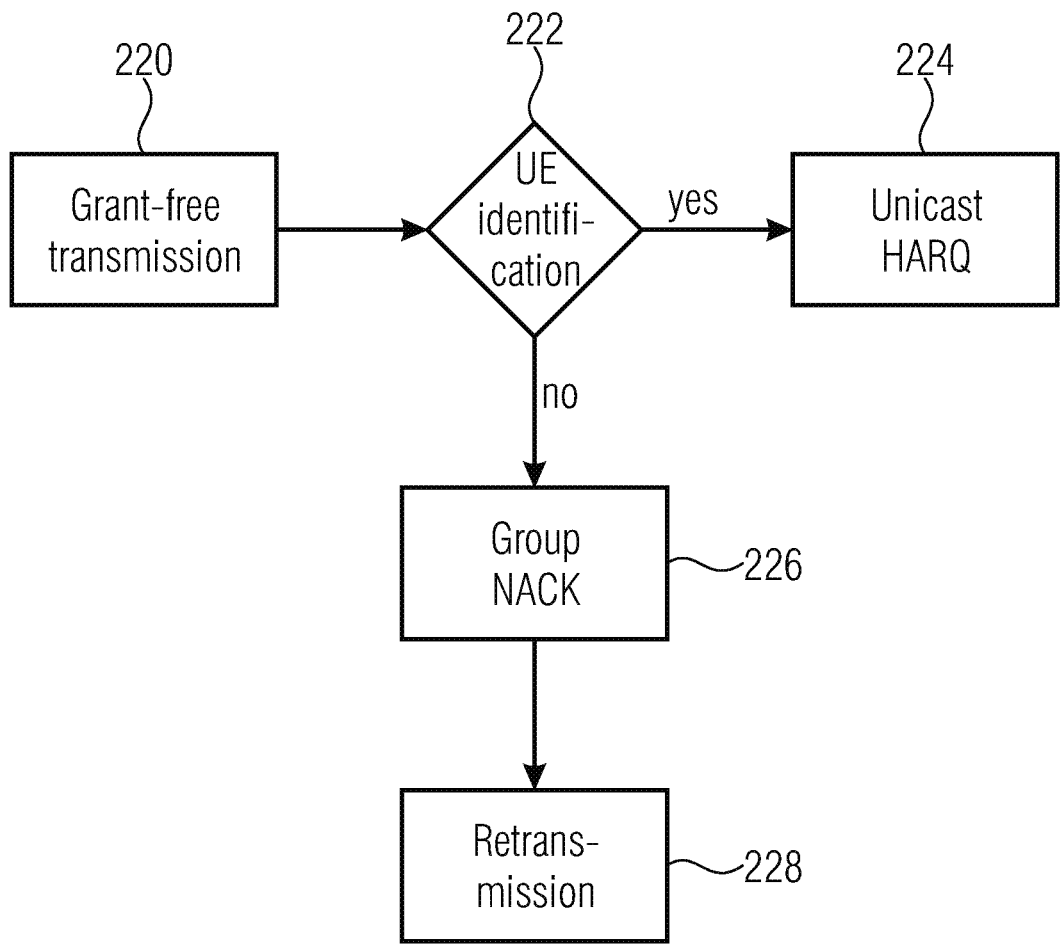
FIG. 4 is a flow diagram illustrating an ARQ/HARQ-related procedure for a grant-free random access in accordance with embodiments of the present invention.

Embodiments of the first aspect inventive approach are now be described in more detail, and FIG. 4 is a flow diagram illustrating the ARQ/HARQ-related procedure for a grant-free random access in accordance with embodiments of the present invention. At block 220 a grant-free transmission is performed by one or more active users of a wireless communication system, for example a wireless communication system as described above with reference to FIG. 1, FIG. 2 or FIG. 3. The grant-free transmission may be performed at specific times or for specific time periods, or, more generally, at predefined grant-free transmission occasions. The UEs of the wireless communication system which perform an uplink transmission using a grant-free transmission scheme are also referred to as GF-UEs. At block 220 one more of the GF-UEs perform a grant-free transmission towards the base station which, at block 222 determines whether the transmissions recognized on the grant-free resources allocated for the grant-free transmission can be identified, i.e., can be associated with the respective GF-UEs. In case a GF-UE is identified, the base station sends an acknowledgement message, for example, a HARQ-ACK message to the identified GF-UE as is indicated at 224. In accordance with further embodiments, rather than sending a unicast HARQ ACK feedback at block 224 also a multicast HARQ ACK feedback may be transmitted. The receiver or base station may send a multicast ACK to the active users that were successively decoded stating the corresponding IDs, UE identities, of the successively decoded active users.

In case one or more of the GF-UEs are not identified at the base station, i.e., in case transmissions are recognized at the base station on the respective grant-free resources, which cannot be associated with a certain user, the base station 200 determines that not all of the UEs using the grant-free uplink transmission were successfully detected or decoded. In this situation, in accordance with embodiments of the present invention, a multicast HARQ NACK feedback is generated at block 226, which is also referred to as a group NACK or a certain signaling. The group NACK is broadcast so as to be received by all UEs served by the base station, and those UEs that did not receive a HARQ ACK feedback (block 224) and that performed an uplink transmission determine that the base station did not identify/receive their transmission. The group NACK which may be broadcast at block 226 causes a retransmission of the uplink transmission as is indicated at block 228 using different parameters. For example, a first or initial grant-free uplink transmission by a UE is performed on the basis of a transmission configuration, also referred to as a GF transmission configuration. Responsive to the group NACK a UE, which realizes that it has not been identified at the base station, causes the retransmission at block 228 but uses a different configuration, also referred to as a GF retransmission configuration.

To allow for the identification of the UEs at the base station during the grant-free uplink transmission, in accordance with embodiments, the uplink transmission may include the UE ID, the UE identifier, which the base station, upon a successful detection and decoding of the transmission may evaluate so as to provide to the identified UE, on the basis of the identifier, the acknowledgement message (block 224). In case the base station realizes that there is some kind of transmission but cannot decode the UE identifier, the group NACK message at block 226 is generated.

In accordance with embodiments of the present invention, the group NACK may include the GF retransmission configuration, i.e., the base station signals towards the respective UEs the parameters or configuration for performing the retransmission which is different from the preceding transmission configuration.

In accordance with other embodiments, the respective UEs may be preconfigured with one or more possible GF retransmission configurations and, responsive to the receipt of the group NACK, one of the preconfigured GF retransmission configuration for performing the retransmission at block 228 may be selected at the UE.

The use of a GF retransmission configuration that is different from the GF transmission configuration allows for an improvement of the system performance as the likelihood that the UEs are still not identified at the next possibility or occasion for a grant-free access is reduced as different parameters or configurations are used. Thus, despite the fact that the overall situation of the network, for example, the load situation, may not have changed, due to the change in the configuration used for the grant-free uplink transmission more UEs may be identified at the base station.

In accordance with embodiments, the base station may send the broadcast NACK message together with an indication of the grant-free resource, GF resource, so that the UEs that transmitted on this GF resource and that did not receive a ACK feedback know that the BS is not aware of the transmission of the UE, and that a retransmission is needed.

GF Re/Transmission Resources/Resource Pools

In accordance with embodiments, the GF retransmission configuration may include one or more GF retransmission resources to be used by the UEs that used the first resource indicated by the GF transmission configuration. The broadcast control message may include information about the new GF retransmission resource or the receipt of the broadcast control message, the NACK message, may cause the UE to select a GF retransmission resource with which the UE is preconfigured.

In accordance with further embodiments, rather than using a GF transmission resource or a GF retransmission resource, a GF transmission resource pool and a GF retransmission resource pool may be provided, and for the first GF transmission a UE may use one or more resources selected from the GF transmission resource pool, and for the retransmission, the UE may use one or more resources from the GF retransmission resource pool.

Figure 5:
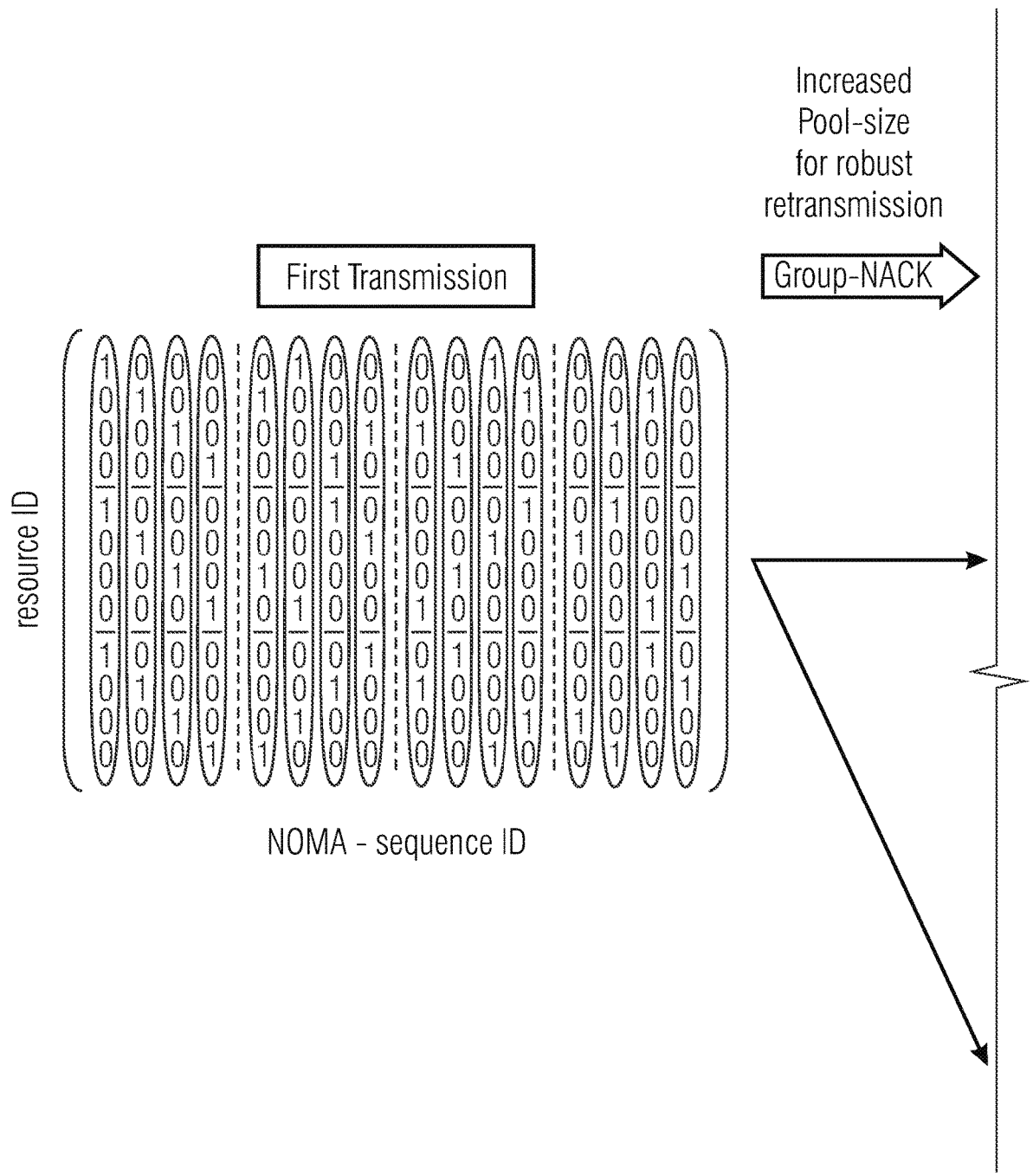
FIG. 5 part 1 and part 2 collectively comprise FIG. 5 and illustrate an embodiment for increasing the pool size for the grant-free retransmission.
Figure 5:
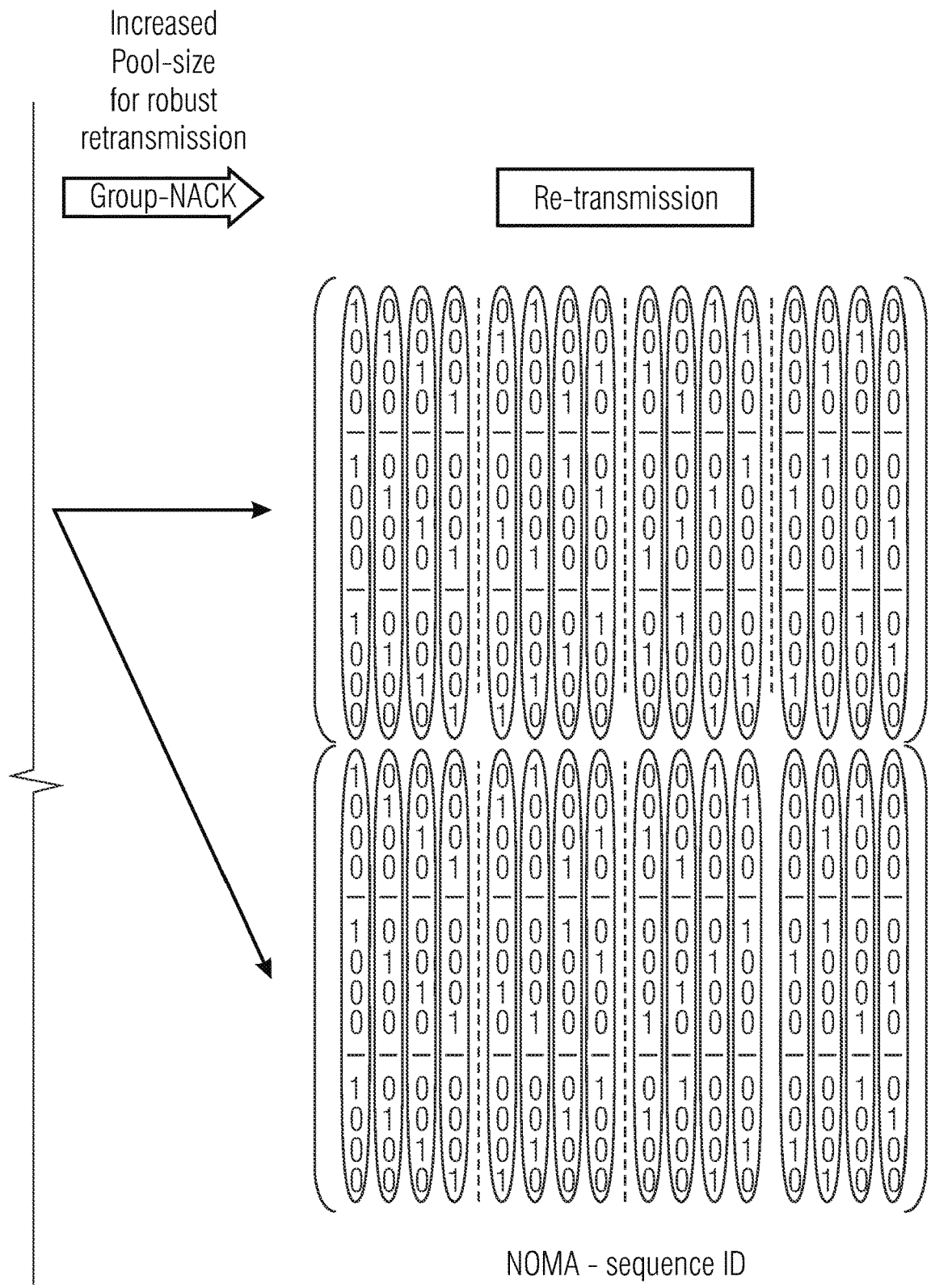

Responsive to the signaling from the base station, for example responsive to receiving the broadcast NACK message, the pool parameters may be modified, for example by increasing the GF transmission pool size to obtain the GF retransmission pool. For example additional frequency and/or time resources may be provided. FIG. 5 illustrates an embodiment for increasing the pool size for the retransmission. In the left part of FIG. 5, the initial or first resource pool is indicated together with respective NOMA-sequence IDs. Responsive the group NACK message the first resource pool is increased, and in accordance with the embodiment depicted in FIG. 5 the size of the first resource pool is doubled, so as to increase the robustness of the retransmission by a higher spreading factor.

In accordance with embodiments, together with the increase in pool size also a preconfigured, more robust NOMA sequence may be used for the retransmission. For example, the UE may use a first NOMA sequence for performing the first transmission, and the UE may be preconfigured with the second NOMA sequence for the retransmission, which is only used in case a broadcast NACK control message is received. In accordance with other embodiments, rather than NOMA sequences also other coding schemes may be used. The more robust NOMA scheme is achieved by a lower coding rate of the second NOMA sequence, as may be seen from a comparison of the respective NOMA sequence IDs of FIG. 5 for the first transmission case and for the retransmission case.

In accordance with other embodiments, the GF retransmission resource pool may include a plurality of GF retransmission resource pools, for example at least a first pool and a second pool. For example, the first pool may be the resource pool indicated in the left part of FIG. 5 and the second pool for the retransmission may be increased in size as shown in the right part of FIG. 5. Thus, the two pools may have different NOMA parameters. However, in accordance with other embodiments, the at least two GF retransmission resource pools may be of the same size and have the same NOMA parameters. For example, the retransmission resource pool shown in the right part of FIG. 5 may be split into two parts having the same size or having different sizes.

In accordance with yet further embodiments, more than two pools may be provided, for example, an additional third GF retransmission resource pool may be provided.

In accordance with embodiments, the UE may randomly select one of the plurality of GF retransmission resource pools to use one or more resources for performing the retransmission.

In accordance with other embodiments, a single retransmission resource pool may be partitioned, and the partitions may be associated with respective UEs dependent on a UE-ID, like a UE specific DMRS, or dependent on a group or service type to which the UE belongs. In accordance with other embodiments, respective pools of the plurality of GF retransmission resource pools may be associated with respective UEs dependent on a UE-ID, like a UE specific DMRS, or dependent on a group or service type to which the UE belongs. For example, a first, larger partition or a first, larger pool of retransmission resources may be used for specific UEs or services, like URLLC, and the remaining partitions or pools may be used for other kinds of UEs.

In accordance with other embodiments, specific UEs, for examples UEs of a specific type or performing a specific service, may use the increased re-transmission pool as indicated in FIG. 5, while the remaining UEs which may not be so critical regarding the latency or the like, may use again the resources from the first transmission pool at the next occurrence of a grant-free uplink transmission. In other words, in accordance with embodiments, not all of the UEs which have not been identified following the first transmission at the base station use the retransmission resource pool, rather, only those UEs for which a reliable uplink transmission is decisive may use the retransmission pool while the remaining UEs may continue to use the original pool. Thus, for some of the UEs, the transmission resources may change while they may do not change or remain fixed for the other UEs.

GF Re/Transmission Back Off Procedure

In accordance with yet other embodiments, the GF retransmission configuration may define a back off procedure using a random or preconfigured back off timer so that, for example, dependent on the UE ID or the service type, a time offset between a time, at which the first transmission during the grant-free transmission period occurred, and a time is determined, at which the retransmission during the next possibility of the grant-free uplink transmission occurs. For example, UEs of a certain type for performing a certain services, for example URLLC UEs, may have associated an offset different from the other UEs so as to more reliably perform the grant-free uplink transmission.

GF Re/Transmission Timing

In accordance with yet further embodiments, the GF transmission configuration may identify a plurality of grant-free access occasions during which grant-free transmissions are to be performed. The plurality of grant-free access occasions includes at least a first grant-free access occasion and a second grant-free access occasion. The GF retransmission configuration may identify at least one further grant-free access occasion during which grant-free retransmissions are to be performed. The further grant-free access occasion is different from the second grant-free access occasions. In other words, the GF transmission configuration defines the next GF occasion, i.e., the GF occasion following the current GF occasion. The GF occasion defined by the GF transmission configuration may identify which GF occasions are to be used and which GF occasions are skipped. Responsive to the certain signaling from the base station, the GF occasion as defined by the GF transmission configuration may be modified using the GF retransmission configuration that identifies a different GF occasion to be used for a retransmission.

In accordance with embodiments, a GF occasion may comprise one or more resources in a time/frequency grid.

Figure 6A:
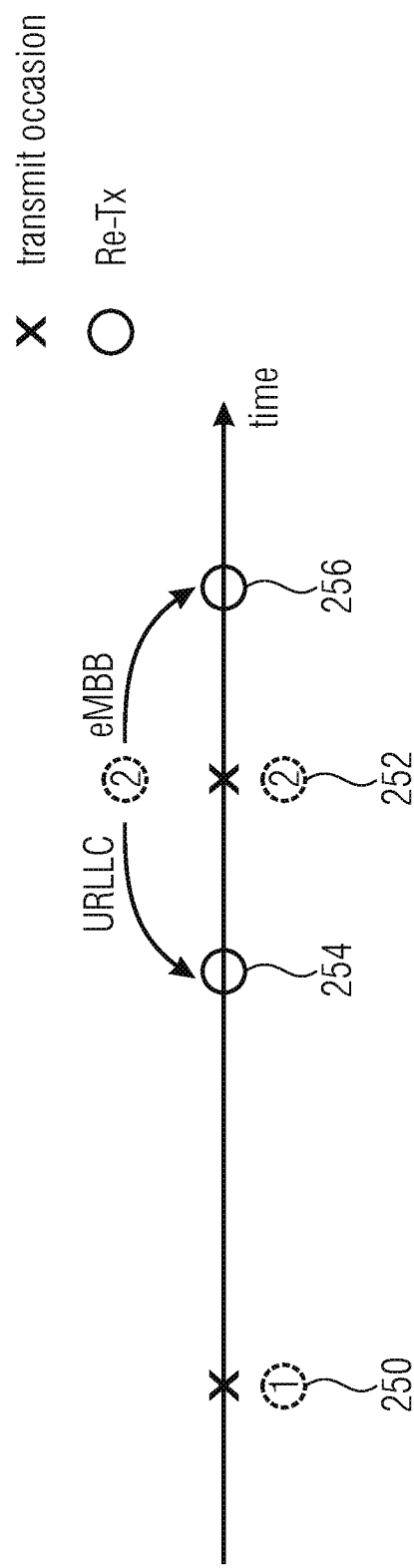
Figure 6B:
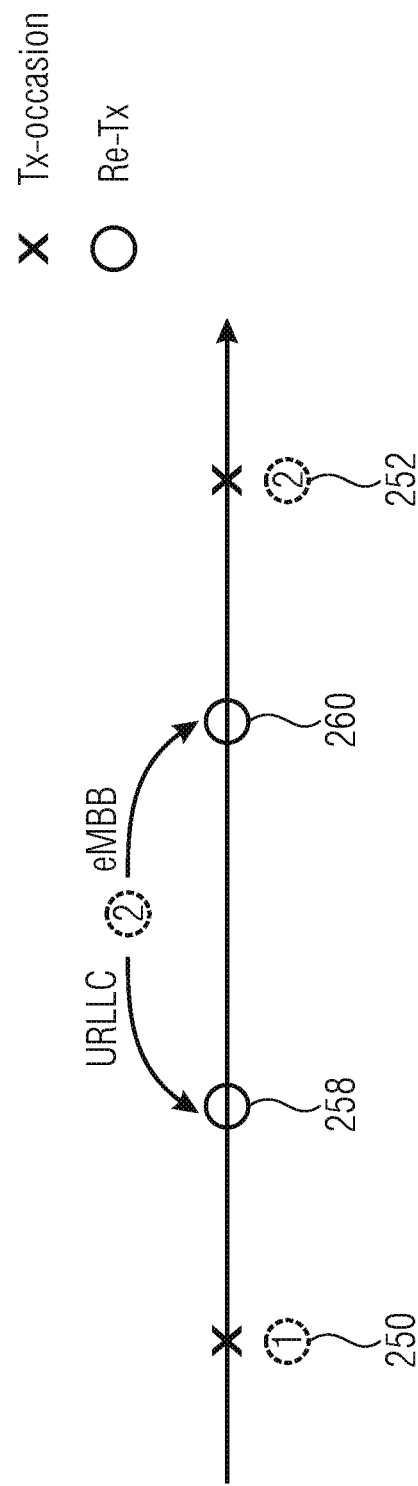

FIG. 6 illustrates embodiments of the GF re/transmission timing in accordance with the inventive approach. For example, latency sensitive UEs or services, like URLLC services, may use for the retransmission a grant-free access occasion as defined by the GF retransmission configuration that is earlier than the second grant-free access occasion defined by GF transmission configuration, while less sensitive UEs or services, like enhanced Mobile BroadBand, eMBB, massive Machine-Type Communication, mMTC, or IoTs, may use a further grant-free access occasion as defined by the GF retransmission configuration that is later or earlier than the second grant-free access occasion.

FIG. 6(*a*) illustrates a first grant-free access occasion 250 and a second grant-free access occasion 252 as defined by the GF transmission configuration during which grant-free transmissions may be performed by the UE. Responsive to the certain signaling, in accordance with embodiments, the UE may modify the second grant-free access occasion 252 in accordance with the GF retransmission configuration to a first further grant-free access occasion 254 that is earlier than the occasion 252, or to a second further grant-free access occasion 256 that is later than the occasion 252. This may be done dependent of the type of UE or service, as mentioned above.

FIG. 6(*b*) illustrates another embodiment in which, similar to FIG. 6(*a*), the GF transmission configuration defines the first grant-free access occasion 250 and the second grant-free access occasion 252 during which grant-free transmissions may be performed by the UE. Responsive to the certain signaling, in accordance with embodiments, the UE may modify the second grant-free access occasion 252 in accordance with the GF retransmission configuration to a further, earlier grant-free access occasions 258 or to a further, later grant-free access occasions 260, both of which are earlier than the occasion 252. Again, this may be done dependent of the type of UE or service, as mentioned above. In accordance with other embodiments, the further earlier and later grant-free access occasions 258, 260, as defined by the GF retransmission configuration, may both be later than the occasion 252.

RRC Configured GF Retransmission Configuration

In accordance with embodiments, the GF retransmission configuration may be RRC configured. A UE-specific RRC signaling may preconfigure the UE with possible retransmission configurations, and responsive to a DCI message a specific one of the plurality of GF retransmission configurations is selected to be used in response to the receipt of the broadcast NACK message from the base station. For example, when considering a GF retransmission resource pool, also referred to as a backup retransmission pool, the UE-specific RRC signaling may indicate a plurality of pool IDs defining the resource pool to be used for the retransmission, for example an increase of an initial pool or the provision of a plurality of pools or the partition of a pool or the like. FIG. 7 shows an example of a UE-specific RRC signaling for indicating a plurality of pool IDs in accordance with embodiments of the present invention.

When using a UE-specific RRC signaling as the one depicted in FIG. 7, a DCI message may be used for selecting the pool of resources to be actually used in response to the NACK message. For example, a DCI format in the PDCCH common search space scrambled with a preconfigured RNTI that is common for all GF-UEs may indicate the initial or first GF transmission pool, and a pool ID for the retransmission pool to be used, for example Pool ID 1, Pool ID 2, . . . Pool ID N.

In accordance with embodiments, the original GF pool may be implicitly signaled via the RNTI. In case the DCI message does not include any entry for the pool ID a default retransmission pool may be used, or the UE may randomly select one of the retransmission pools defined by the RRC signaling.

DCI Configured GF Retransmission Configuration

In accordance with other embodiments, the retransmission pool may be DCI configured. In such embodiments, the DCI message may be sent as a DCI format in the PDCCH common search space and is scrambled with a preconfigured RNTI that is common for all GF-UEs that are supposed to receive the DCI, for example all UEs that are allowed to perform a grant-free uplink transmission to the base station. The DCI message includes the initial or first GF transmission pool and the retransmission pool parameters for the different pools available from which one is selected responsive to the NACK message. In accordance with other embodiments, the original GF retransmission pool may be signaled implicitly via the RNTI.

With regard to the above described embodiments concerning an RRC configured or DCI configured retransmission pool, it is noted that also the other GF retransmission configurations described above may be configured in either of the above described ways.

In accordance with embodiments, the change of the GF transmission configuration or strategy to the GF retransmission configuration or strategy may be signaled via a global codebook known to the base station and the served UEs, or it may be generated on the fly per UE or group. In the latter case, past transmission/retransmission configurations may be indexed, and it may be signaled that a certain transmission/retransmission configuration or strategy from a predefined number of TTIs back in time is to be used. In such an embodiment, the base station and the UEs keep track on the respective transmission/retransmission configurations or strategies used during preceding TTIs.

Second Aspect

In accordance with the second aspect, the present invention addresses a problem that a base station may not distinguish between totally empty GF resources and overloaded GF resources. In both scenarios, the base station does not decode any data or information because in the first scenario there is no data to be decoded, and in the second scenario the data cannot be decoded due to the overloaded GF resource pool. This may make it difficult to properly evaluate, for example, the utilization of a resource pool, to properly detect an inter-cell interference, and/or to properly detect traffic types.

User Equipment

To address this problem, in accordance the second aspect, the present invention provides a user equipment, UE, as it is shown in FIG. 3, for a wireless communication network including one or more base stations and UEs, wherein a plurality of UEs is served by a base station and is configured to perform a grant-free transmission to the serving base station. The UE 202 performs a grant-free data transmission to the base station 200 using a grant-free, GF, transmission scheme. The UE 202 transmits, responsive to a grant-free data transmission, a predefined signal to the base station 200 using a predefined grant-free resource. All UEs 202, which are served by the BS 200 and which perform a grant-free data transmission, transmit the same predefined signal on the same predefined grant-free resource. The predefined signal allows the base station 200 to determine that a grant-free transmission occurs.

In accordance with embodiments, the grant-free resource is a resource selected from a grant-free resource pool.

In accordance with embodiments, the UE is configured to select a predefined signal from a plurality of predefined signals dependent on the UE type or dependent on a service provided by the UE, thereby allowing the base station to discriminate UEs of different types.

Base Station

In accordance the second aspect, the present invention provides a base station, BS, as it is shown in FIG. 3, for a wireless communication network including one or more base stations and a plurality of UEs. The BS 200 serves one or more UEs 202 of the wireless communication network. A certain number of the UEs 202, which are served by the BS 200, perform a grant-free transmission to the base station 200 and transmit, responsive to a grant-free data transmission, a predefined signal to the base station 200 using a predefined grant-free resource so that all of the certain UEs 200 transmit the same signal on the same predefined grant-free resource. The BS 200 receives from the certain UEs 202 the respective predefined signals on the predefined grant-free resource so as to detect that a grant-free transmission from the certain UEs 202 occurs.

In accordance with embodiments, in case the base station detects that a grant-free transmission from the certain UEs occurs and no grant-free transmission from the certain UEs can be successfully decoded, the base station is configured to determine overloading.

In accordance with embodiments, responsive to determining the overloading, the BS is configured to allocate more resources, e.g., time-frequency resources, or increase a resource pool for the GF access, and/or assign to one or more of the certain UEs dedicated resources outside the GF resources.

In accordance with embodiments, all of the certain UEs transmit together with the same signal a UE-ID, and wherein, in case the base station detects that a grant-free transmission from the certain UEs occurs and a grant-free transmission can be successfully decoded from a subset of the certain UEs, the base station is configured to determine a degree of overloading.

In accordance with embodiments, the BS is configured to decrease an overloading factor to improve the reception quality, if overloading is detected, and to increase the overloading factor for having a more efficient transmission, if underloading is detected.

In accordance with embodiments, certain UEs from a neighboring cell use a further predefined signal different for the predefined signal used by the certain UEs served by the base station, and wherein, based on the received predefined signals and further predefined signals, the BS is configured to detect an inter-cell interference.

In accordance with embodiments, using the detected inter-cell interference, the BS is configured to use a sequence for identifying UEs served by the base station which is different from a sequence used by a neighboring cell for identifying certain UEs from the neighboring cell.

In accordance with embodiments, the certain UEs transmit a predefined signal selected from a plurality of predefined signals dependent on the UE type or dependent on a service provided by the UE, and wherein, using the different predefined signals, the BS is configured to detect traffic types.

In accordance with embodiments, using the detected traffic types, the BS is configured to use first sequences for identifying UEs of a first type, e.g., URLLC devices, and second sequences for identifying UEs of a second type, e.g., eMBB devices, and/or allow special procedures for UEs of a certain type, e.g., UEs handling latency critical traffic, like an evacuation of retransmission resources (pre-emption).

Thus, in accordance with the second aspect of the present invention, the signaling received from the GF-UEs allows the base station to determine that a GF transmission occurs. In accordance with embodiments, the aim is not to identify the UEs, but to detect if there is any grant-free transmission at all which is achieved by causing the UEs to transmit all the same signal on the same predefined resource.

Evaluation of Pool Utilization

In accordance with embodiments of the second aspect of the inventive approach an evaluation of a GF-pool utilization may be performed as now the base station can distinguish between totally empty GF resources and overloaded GF resources, and an overloading of the GF resources can be detected.

In accordance with embodiments, the certain UEs transmit together with the same signal a UE-ID, so that the base station may identify at least some of the UEs detects which allows determining a degree of overloading.

In accordance with further embodiments, the base station, responsive to the detected overloading or to the determined degree of overloading, may perform a mitigation to allocate more time-frequency resources for the GF access to cope with the overloading issue. In accordance with embodiments, some of the identified UEs may be assigned dedicated resources so that they do not occupy the GF resources.

In accordance with other embodiments, the base station, responsive to the detected overloading or to the determined degree of overloading, may lower an overloading factor to improve the reception quality. If underloading is detected, the overloading factor may be increased for having a more efficient transmission.

Further, this allows the base station to calculate the Channel Busy Ratio (CBR).

Detection of Inter-Cell Interference, ICI

In accordance with embodiments of the second aspect of the inventive approach an ICI may be detected performed as now the base station can distinguish between the UEs it serves and which use a first predefined signal and UEs served by a neighboring cell or base station which use a second predefined signal.

In accordance with embodiments, the interference may be measured so that the network may coordinate the power control over the cells. This is advantageous as it avoids that each cell is increasing its transmit power independently because of a bad reception which would lead to a heavy cell interference.

Responsive to the ICI the BS may employ a sequence for identifying UEs served by the base station which is different from a sequence used by a neighboring cell for identifying certain UEs from the neighboring cell. For example, a sequence may be used that is distinguishable for the BS from other sequences, e.g., Zadoff-Chu sequences with different cyclic shifts. In accordance with other examples, a completely different sequence may be used for the identification. This minimizes interference of neighboring cells because when using for all UEs of neighboring cells the same sequence on the same resource, the measurements of each of the cells would be polluted by cell-edge UEs belonging to another cell.

Improved Detection of Traffic Types

In accordance with embodiments of the second aspect of the inventive approach certain UEs may transmit a predefined signal selected from a plurality of predefined signals dependent on the UE type or dependent on a service provided by the UE, so that the BS may detect traffic types.

For example, dependent on the detected traffic types, the BS may use first sequences for identifying UEs of a first type, e.g., URLLC devices, and second sequences for identifying UEs of a second type, e.g., eMBB devices. According to other examples, the BS may allow for special procedures for UEs of a certain type, e.g., UEs handling latency critical traffic, like an evacuation of retransmission resources (pre-emption).

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 8 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A user equipment, UE, of one or more UEs for a wireless communication network comprising one or more base stations:
    wherein the UE is configured to perform a grant-free, GF, transmission to a base station of the one or more base stations using a GF transmission resource, the GF transmission being performed in accordance with a GF transmission configuration including the GF transmission resource,
    wherein the UE is configured to receive from the base station a signaling, the signaling holding an indication that a transmission recognized at the base station on the GF transmission resource cannot be associated with a certain UE of the one or more UEs whereby an identity of the certain UE cannot be derived from the transmission, and
    wherein, responsive to the signaling from the base station, the UE is configured to retransmit the GF transmission in accordance with a GF retransmission configuration, the GF retransmission configuration being different from the GF transmission configuration.

2. The UE of claim 1, wherein
    the GF transmission configuration comprises a GF transmission resource pool, and
    the GF retransmission configuration comprises a GF retransmission resource different from the GF transmission resource or a GF retransmission resource pool different from the GF transmission resource pool.

3. The UE of claim 2, wherein the GF retransmission resource pool is larger than the GF transmission resource pool.

4. The UE of claim 2, wherein
    the GF retransmission resource pool comprises the GF transmission resource pool and additional resources, or
    the GF retransmission resource pool comprises resources different from the GF transmission resource pool.

5. The UE of claim 2, wherein the UE is configured to select the GF retransmission resource randomly from the GF retransmission resource pool.

6. The UE of claim 2, wherein the GF retransmission resource pool comprises a plurality of retransmission resource pools, the plurality of retransmission resource pools being of the same size or of different sizes, and the plurality of retransmission resource pools comprising a first GF retransmission resource pool and second GF retransmission resource pool.

7. The UE of claim 6, wherein the UE is configured to select the GF retransmission resource from the first GF retransmission resource pool and from the second GF retransmission resource pool
   randomly, or
   based on a UE-ID or on a group or service type.

8. The UE of claim 6, wherein the GF retransmission resource pool comprises, in addition to the first and second GF retransmission resource pools, at least one further GF retransmission resource pool.

9. The UE of claim 1, wherein
   the GF transmission configuration comprises a GF transmission coding scheme, and
   the GF retransmission configuration comprises a GF retransmission coding scheme, the GF transmission coding scheme being different from the GF retransmission coding scheme.

10. The UE of claim 9, wherein the GF transmission coding scheme comprises a first NOMA sequence, and the GF retransmission coding scheme comprises a second NOMA sequence, the second NOMA sequence being more robust than the first NOMA sequence.

11. The UE of claim 1, wherein
    the GF transmission configuration comprises a time at which the GF transmission is performed, and
    the GF retransmission configuration comprises a plurality of time offsets for the retransmission relative to the time of the GF transmission.

12. The UE of claim 11, wherein the UE is configured to select, based on a UE-ID or on a group or service type, from the plurality of time offsets
    randomly a time offset for the GF retransmission, or
    a preconfigured time offset for the GF retransmission.

13. The UE of claim 12, wherein UEs of the one or more UEs of a certain type use the preconfigured time offset, and other UEs of the one or more UEs use the random time offset.

14. The UE of claim 1, wherein
    the GF transmission configuration comprises or identifies a plurality of GF access occasions during which GF transmissions are to be performed, the plurality of GF access occasions comprising at least a first GF access occasion and a second GF access occasion, and
    the GF retransmission configuration comprises or identifies, in addition to the first and second GF access occasions, at least one further GF access occasion during which GF retransmissions are to be performed, the further GF access occasion being different from the second GF access occasion.

15. The UE of claim 14, wherein first UEs of the one or more UEs use a first further GF access occasion that is earlier than the second GF access occasion, and second UEs of the one or more UEs use a second further GF access occasion that is later or earlier than the second GF access occasion.

16. The UE of claim 1, wherein
    the UE is preconfigured with a plurality of GF retransmission configurations, and the UE is configured to receive a control message indicating which of the plurality of GF retransmission configurations is to be used by the UE responsive to the signaling, or
    the UE is configured to receive a control message indicating the plurality of GF retransmission configurations, and wherein the signaling indicates which of the plurality GF retransmission configurations is to be used by UE responsive to receiving the signaling, or
    the signaling comprises the GF retransmission configuration to be used by UE responsive to receiving the signaling.

17. A base station, BS, for a wireless communication system, wherein:
    the BS is configured to serve one or more user equipments, UEs, wherein the one or more UEs, which are served by the BS, are configured to perform a grant-free, GF, transmission to the BS using a GF transmission resource, the GF transmission being performed in accordance with a GF transmission configuration including the GF transmission resource,
    the BS is configured to receive from the one or more UEs respective GF transmissions and to determine whether the one or more UEs can be identified from the respective GF transmissions, and
    in case some or all of the one or more UEs cannot be identified from the respective GF transmissions by the BS, the BS is configured to transmit a signaling, the signaling holding an indication that a transmission recognized at the base station on the GF transmission resource cannot be associated with a certain UE of the one or more UEs whereby an identity of the certain UE cannot be derived from the transmission, and causing the one or more UEs to retransmit the GF transmission in accordance with a GF retransmission configuration, the GF retransmission configuration being different from the GF transmission configuration.

18. A method, comprising:
    performing, by a user equipment, UE, of one or more UEs of a wireless communication network, which comprises one or more base stations, a grant-free, GF, transmission to at least one base station of the one or more base stations using a GF transmission resource, the GF transmission being performed in accordance with a GF transmission configuration including the GF transmission resource,
    receiving, at the UE, from the at least one base station a signaling, the signaling holding an indication that a transmission recognized at the at least one base station on the GF transmission resource cannot be associated with a certain UE of the one or more UEs the whereby an identity of the certain UE cannot be derived from the transmission, and
    responsive to the signaling from the at least one base station, retransmitting, by the UE, the GF transmission in accordance with a GF retransmission configuration, the GF retransmission configuration being different from the GF transmission configuration.

19. The method of claim 18, comprising:
    serving, by the at least one base station, the UE,
    receiving, by the at least one base station, from the UE the GF transmission and determining whether the UE can be identified from the GF transmission, and in case the UE cannot be identified by the at least one base station, transmitting, by the at least one base station, the signaling.

20. A non-transitory digital storage medium having a computer program stored thereon, wherein the program, when run by a computer, performs a method comprising:

performing, by a user equipment, UE, of one or more UEs of a wireless communication network, which comprises one or more base stations, a grant-free, GF, transmission to a base station of the one or more base stations using a GF transmission resource, the transmission being performed in accordance with a GF transmission configuration including the GF transmission resource, receiving, at the UE, from the base station a signaling, the signaling holding an indication that a transmission recognized at the base station on the GF transmission resource cannot be associated with a certain UE of the one or more UEs whereby an identity of the certain UE cannot be derived from the transmission, and responsive to the signaling from the base station, retransmitting, by the UE, the GF transmission in accordance with a GF retransmission configuration, the GF retransmission configuration being different from the GF transmission configuration.

* * * * *

UNITED STATES PATENT AND TRADEMARK OFFICE
CERTIFICATE OF CORRECTION

PATENT NO. : 12,381,659 B2
APPLICATION NO. : 18/447551
DATED : August 5, 2025
INVENTOR(S) : Zoran Utkovski et al.

Page 1 of 1

It is certified that error appears in the above-identified patent and that said Letters Patent is hereby corrected as shown below:

On the Title Page

Item [73], delete "FRAUNHOFER-GESELLSCHAFT ZUR FORDERUNG DER ANGEWANDT FORSCHUNG E.V." and substitute therefore --Fraunhofer-Gesellschaft zur Förderung der angewandten Forschung e.V.--

Signed and Sealed this
Twenty-seventh Day of January, 2026

John A. Squires
*Director of the United States Patent and Trademark Office*